US010369914B2

(12) United States Patent
Scott et al.

(10) Patent No.: US 10,369,914 B2
(45) Date of Patent: Aug. 6, 2019

(54) RETAINING FEATURE FOR OFF-ROAD CUP HOLDERS (71) Applicant: CNH Industrial America LLC, New Holland, PA (US)

(72) Inventors: Shane M. Scott, Bolingbrook, IL (US); Salvatore Virgilio, Woodbridge, IL (US)

(73) Assignee: CNH Inudstrial America LLC, New Holland, PA (US)

( * ) Notice: Subject to any disclaimer, the term of this patent is extended or adjusted under 35 U.S.C. 154(b) by 0 days.

(21) Appl. No.: 15/685,625

(22) Filed: Aug. 24, 2017

(65) Prior Publication Data
US 2019/0061589 A1 Feb. 28, 2019

(51) Int. Cl.
*B60N 3/10* (2006.01)
*F16B 1/00* (2006.01)
*B65D 25/28* (2006.01)

(52) U.S. Cl.
CPC .......... *B60N 3/101* (2013.01); *B65D 25/2811* (2013.01); *F16B 1/00* (2013.01); *F16B 2001/0035* (2013.01)

(58) Field of Classification Search
CPC ........ B60N 3/101; B60N 3/108; B60N 3/105; B60N 3/103; B60N 3/10; B60N 3/18; A47G 23/02; A47G 23/0208; A47G 23/0266; A47G 23/0216; A47G 23/0225; B65D 25/2811; B65D 25/22; F16B 1/00
USPC ............... 220/483, 480, 636, 635, 737, 630; 248/683, 309.4, 309.1, 149, 146, 311.2,
(Continued)

(56) References Cited

U.S. PATENT DOCUMENTS

| 425,768 A | * | 4/1890 | Ezell | .............. A47G 19/10 248/362 |
| 2,959,832 A | * | 11/1960 | Baermann | .......... A45C 13/1069 174/110 A |

(Continued)

FOREIGN PATENT DOCUMENTS

DE 102005019035 A1 * 10/2006 ............. B60N 3/102

OTHER PUBLICATIONS

"Top 10 Best Magnetic Car Mounts Review for 2016" retrieved from http://www.buythebest10.com/top-10-best-magnetic-car-mounts-review/, Jun. 19, 2016 (10 pages).

*Primary Examiner* — Robert J Hicks
(74) *Attorney, Agent, or Firm* — Richard K. DeMille; Rebecca L. Henkel (57) ABSTRACT

A beverage retaining system for an off-road vehicle. The beverage retaining system includes a cup holder tray that has a cup receiving portion with a bottom wall, and at least one magnetic element located subjacent to the bottom wall of the cup receiving portion. The magnetic element is configured to provide a magnetic retention force. The beverage retaining system also includes a beverage container that has a bottom end and at least one retaining element located on the bottom end. The beverage container is configured to be moveable between a secured position in which the at least one retaining element substantially engages with the magnetic retention force of the at least one magnetic element and an unsecured position in which the at least one retaining element substantially disengages with the magnetic retention force of the at least one magnetic element.

19 Claims, 6 Drawing Sheets

(58) Field of Classification Search
USPC ..... 248/314, 206.5; 206/818, 560, 565, 559, 206/564; 224/562, 926, 544
See application file for complete search history.

(56) References Cited

U.S. PATENT DOCUMENTS

| | | | |
|---|---|---|---|
| 3,013,688 A * | 12/1961 | Luning | A47G 23/03 |
| | | | 215/376 |
| 3,524,614 A | 8/1970 | Sorth | |
| 3,610,459 A * | 10/1971 | Hanson | A47G 19/10 |
| | | | 206/818 |
| 3,808,577 A | 4/1974 | Mathauser | |
| 5,704,579 A | 1/1998 | Celentino et al. | |
| 6,305,656 B1 | 10/2001 | Wemyss | |
| 6,670,583 B2 | 12/2003 | Kara | |
| 6,994,305 B2 | 2/2006 | Schenk, Jr. | |
| 7,494,098 B1 | 2/2009 | Fulda | |
| 7,582,828 B2 | 9/2009 | Ryan | |
| 7,850,006 B2 * | 12/2010 | Uchiyama | A61B 1/00144 |
| | | | 206/350 |
| 7,897,088 B2 | 3/2011 | Mitchell | |
| 8,925,881 B2 | 1/2015 | Diatzikis et al. | |
| 9,157,573 B1 | 10/2015 | Zach et al. | |
| 9,457,945 B1 * | 10/2016 | Wang | B65D 71/70 |
| 2003/0047578 A1 * | 3/2003 | Barnett | A45F 3/18 |
| | | | 224/562 |
| 2005/0269474 A1 | 12/2005 | Kazyaka | |
| 2014/0263382 A1 | 9/2014 | Arnold | |
| 2015/0031256 A1 | 1/2015 | Arnold et al. | |
| 2017/0240085 A1 * | 8/2017 | Ferreira Orta | B60N 3/10 |

\* cited by examiner

RETAINING FEATURE FOR OFF-ROAD CUP HOLDERS

FIELD OF THE INVENTION

The present invention pertains to an off-road vehicle and, more specifically, to an off-road vehicle with a beverage retaining system.

BACKGROUND OF THE INVENTION

Many off-road vehicles such as combines, tractors, bulldozers, backhoes, etc., include cup holders as an accommodating feature so that an operator may enjoy a beverage while operating the off-road vehicle. The cup holder may be mounted on a vehicle instrument panel or on a console adjacent to the operator's seat. A typical cup holder may be in the form of a rigid plastic tray that has a relatively shallow and annular cup-receiving depression that fits a range of or a particular size of beverage container(s). Some cup holders have holding features, for example deformable rubber members or fingers, that are designed to contact and keep a beverage container from moving laterally or from tipping over. When operating in level ground, such holding features may be sufficient to keep the beverage container from tipping over. However, such holding features may be ineffective to retain the beverage container in certain circumstances. For example, in circumstances with undulating terrain, the off-road vehicle may experience sudden vertical accelerations which may cause the beverage container to be vertically jettisoned out of the cup holder. As can be appreciated, it is undesirable for the beverage container to be tipped over or otherwise fall out of the cup holder.

What is needed in the art is an efficient and cost-effective retaining feature for a cup holder of an off-road vehicle.

SUMMARY OF THE INVENTION

The present invention provides a beverage retaining system that allows a beverage container to be rotated in between a secured and an unsecured position. The beverage retaining system includes a clocking feature to facilitate the engagement and disengagement of a magnetic retention force.

The invention in one form is directed to a beverage retaining system for an off-road vehicle. The beverage retaining system includes a cup holder tray that has a cup receiving portion with a bottom wall, and at least one magnetic element located subjacent to the bottom wall of the cup receiving portion. The magnetic element is configured to provide a magnetic retention force. The beverage retaining system also includes a beverage container that has a bottom end and at least one retaining element located on the bottom end. The beverage container is configured to be moveable between a secured position in which the at least one retaining element substantially engages with the magnetic retention force of the at least one magnetic element and an unsecured position in which the at least one retaining element substantially disengages with the magnetic retention force of the at least one magnetic element.

The invention in another form is directed to a cup holder tray. The cup holder tray includes a cup receiving portion with a bottom wall. The cup receiving portion is configured to receive a beverage container. The cup holder tray also includes a clocking feature adjacent to the cup receiving portion and configured to limit a rotational movement of the beverage container between a first position and a second position. The cup holder tray also includes at least one magnetic element located subjacent to the bottom wall of the cup receiving portion. The at least one magnetic element is configured to provide a magnetic retention force such that in the second position the beverage container is held within the cup receiving portion as at least one member of the beverage container substantially engages with the magnetic retention force, and in the first position the beverage container is freely removable as the at least one member of the beverage container is not substantially engaged with the magnetic retention force.

The invention in yet another form is directed to a method for retaining a beverage in an off-road vehicle. The method includes the steps of providing a beverage retaining system that includes a cup holder tray which includes a cup receiving portion with a bottom wall and at least one magnetic element located subjacent to the bottom wall of the cup receiving portion. The at least one magnetic element is configured to provide a magnetic retention force. The beverage retaining system also includes a beverage container that has a bottom end and at least one retaining element located on the bottom end. The beverage container is configured to be moveable between a secured position in which the at least one retaining element substantially engages with the magnetic retention force of the at least one magnetic element and an unsecured position in which the at least one retaining element substantially disengages with the magnetic retention force of the at least one magnetic element. The method includes the further steps of placing the beverage container within the cup holder tray, and rotating the beverage container until the beverage container is in the secured position. The method includes the further steps of rotating the beverage container until the beverage container is in the unsecured position, and removing the beverage container from the cup holder tray.

An advantage of the present invention is that a beverage container may be held within a cup holder tray under extreme vertical accelerations.

Another advantage of the present invention is that a beverage container may be easily and efficiently secured and unsecured within a cup holder tray.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

Corresponding reference characters indicate corresponding parts throughout the several views. The exemplification set out herein illustrates an embodiment, in one form, of the invention and such exemplification is not to be construed as limiting the scope of the invention in any manner.

DETAILED DESCRIPTION OF THE INVENTION

Referring now to the drawings, and more particularly to FIGS. 1-5, there is shown a beverage retaining system 10 for an off-road vehicle. The off-road vehicle may be in the form of an agricultural tractor, a combine, a bulldozer, etc. The beverage retaining system 10 generally includes a beverage container 12 and a cup holder tray 14.

Figure 1:
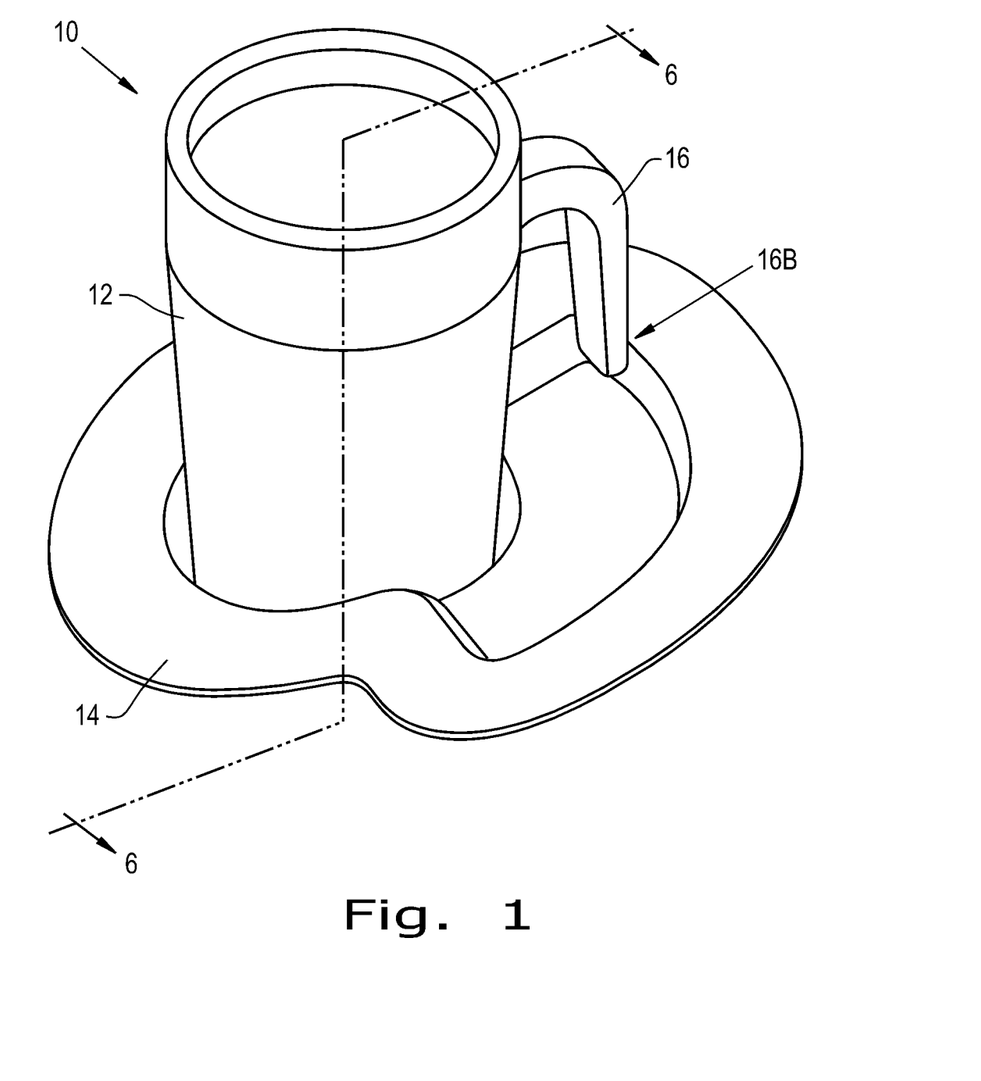
FIG. 1 illustrates a perspective view of an exemplary embodiment of a beverage retaining system of an off-road vehicle, the beverage retaining system comprising a beverage container and a cup holder with a clocking feature, in accordance with an exemplary embodiment of the present invention.
Figure 2:
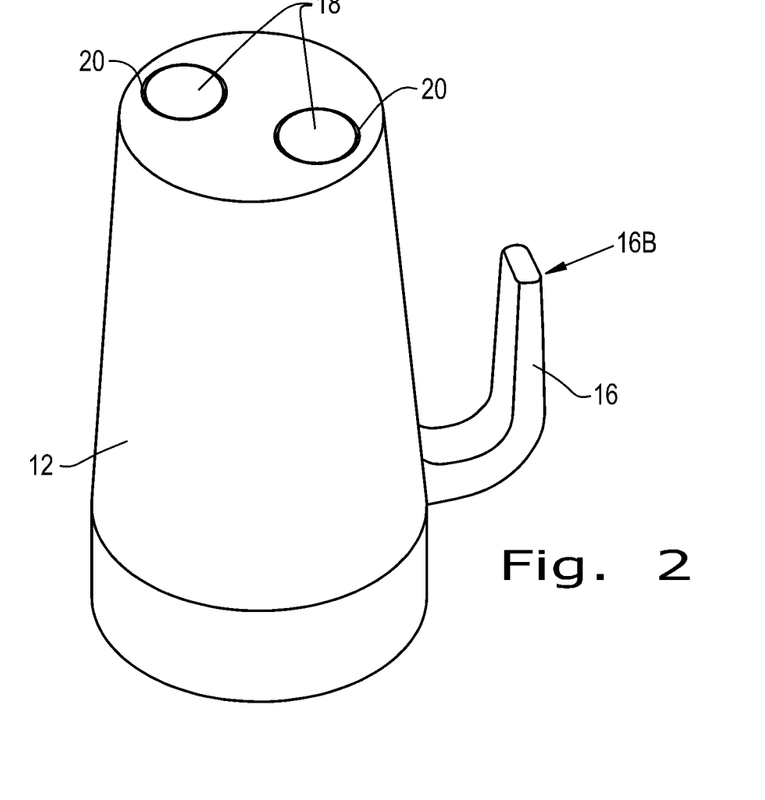
FIG. 2 illustrates the beverage container of the beverage retaining system of FIG. 1, in accordance with an exemplary embodiment of the present invention.

The beverage container 12 has a substantially cylindrical body with a top end, a middle portion, and a bottom end. The beverage container 12 may also include one or more retaining elements 18, as well as a protrusion in the form of a handle 16 that has a bottom end 16B. For example, the beverage container 12 may include two retaining elements 18 that are positioned opposite one another, offset by 180 degrees, on the bottom end of the beverage container 12 (FIG. 2). The retaining elements 18 may be in the form of ferrous and/or magnetic elements. Both retaining elements 18 may be composed of the same material, or one retaining element 18 may be in the form of a ferrous blank 18 and the other may be in the form of a magnetic element. As shown, the retaining elements 18 are in the form of coin-shaped steel blanks 18. However, the retaining elements 18 may be composed of any desired shape and thickness. The retaining elements 18 may be coated with a corrosion resistant coating. The beverage container 12 may additionally include one or more recesses 20 located on its bottom surface that are configured for housing the retaining element(s) 18. Thereby, as the retaining elements 18 are fitted within the recesses 20, the bottom surface of the retaining elements 18 may be level with the bottom surface of the beverage container 12 (FIG. 2). The retaining elements 18 may be fixed within the recesses 20 by adhesives, a compression fit, a locking mechanism, etc. Alternatively, the retaining elements 18 may be located on the annular periphery of the beverage container 12 instead of being located at the bottom of the beverage container 12. The beverage container 12 may be composed of any desired metal, plastic, and/or composite material.

Figure 3:
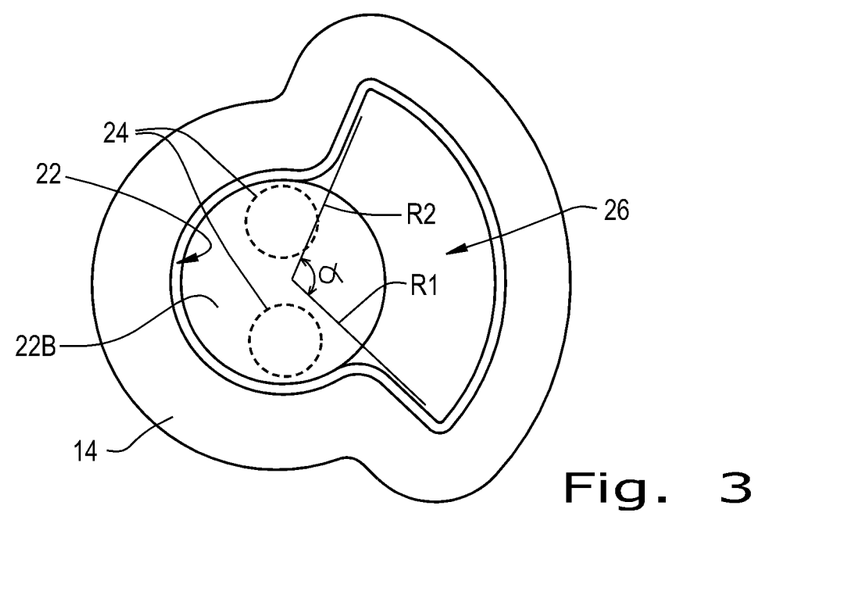
FIG. 3 illustrates a top view of the cup holder of the beverage retaining system of FIG. 1, in accordance with an exemplary embodiment of the present invention.

The cup holder tray 14 is configured to receive and hold the beverage container 12. The cup holder tray 14 may include an annular cup receiving portion 22 with a bottom wall 22B, one or more magnetic elements 24, and a clocking feature 26 (FIG. 3). The cup holder tray 14 may be composed of any desired material including a metal, a plastic, and/or a composite. The cup receiving portion 22 and the clocking feature 26 may be monolithically formed as part of the body of the cup holder tray 14. The cup holder tray 14 may be incorporated into an instrument panel or console of an off-road vehicle.

Figure 4:
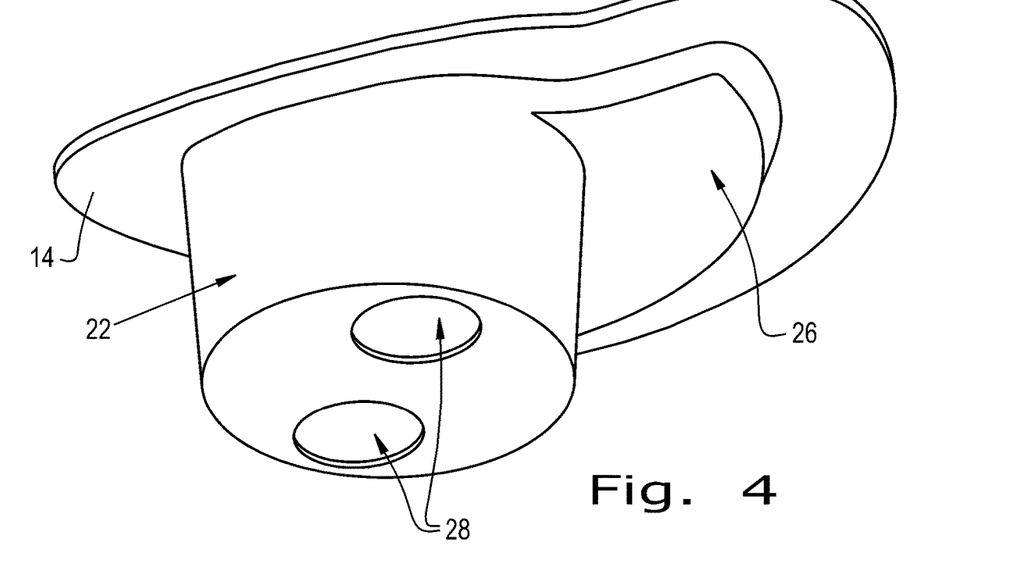
FIG. 4 illustrates a bottom perspective view of the cup holder of the beverage retaining system of FIG. 1, in accordance with an exemplary embodiment of the present invention.
Figure 5:
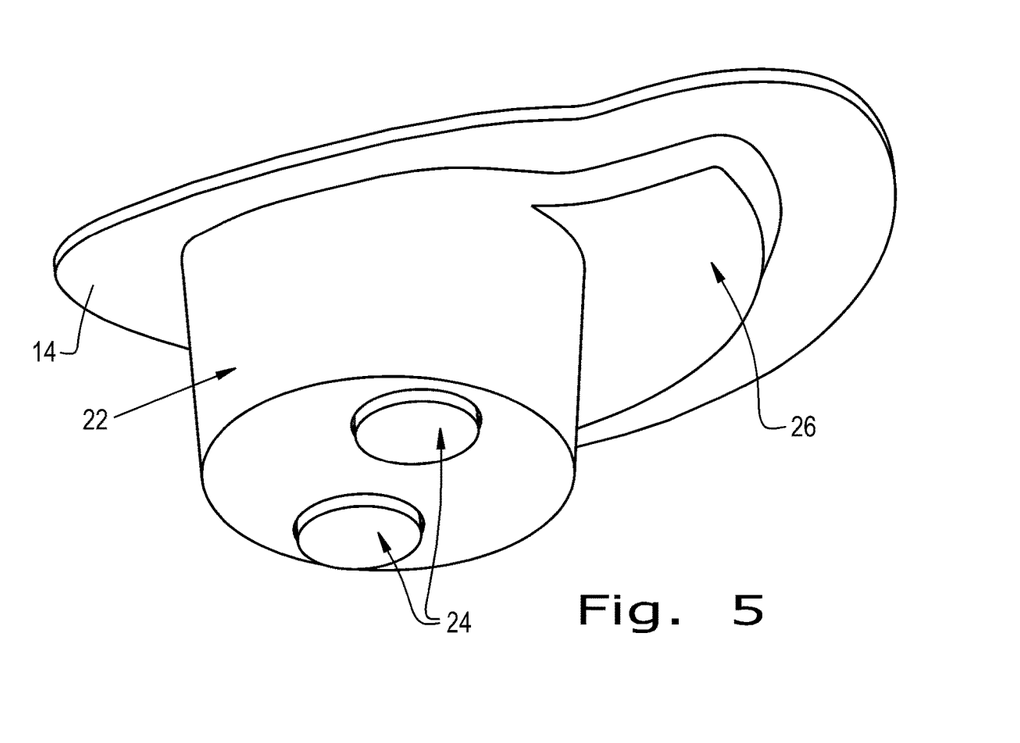
FIG. 5 illustrates the magnetic elements of the cup holder of FIG. 1, in accordance with an exemplary embodiment of the present invention.

The magnetic element(s) 24 may be configured to provide a magnetic retention force such that the beverage container may be rotated between a secured position and an unsecured position. The magnetic element(s) 24 may be subjacent to the bottom wall 22B of the annular cup receiving portion 22 of the cup holder tray 14. As shown, there are two magnetic elements 24 that are disposed opposite one another, offset by 180 degrees (FIG. 5). The cup receiving portion 22 of the cup holder tray 14 may also include recesses 28 that are configured to at least partially house the magnets 24 (FIG. 4). Thereby, only a small amount of cup holder tray material, such as approximately 1 mm, may separate the magnetic elements 24 and the retaining elements 18 from one another. The magnetic elements 24 may be fixedly attached within the recesses 28 as discussed above with respect to the retaining elements 18. Alternatively, the magnetic element(s) 24 may be positioned on top of the bottom wall 22B or may even be located along the annular outer periphery of the cup receiving portion 22. The magnetic elements 24 may be in the form of permanent magnets, including neodymium, samarium-cobalt, alnico, and/or ceramic magnets. It should be appreciated that the magnetic elements 24 can be made of various strength magnets including permanent and/or temporary magnets. It should be appreciated that the magnetic elements 24 may be oriented to have the same magnetic pole face upwardly or opposing magnetic poles which face upwardly.

The clocking feature 26 of the cup holder tray 14 is adjacent to the annular cup receiving portion 22. The clocking feature 26 may be in the form of a depressed arcuate section extending between a first radius R1 and a second radius R2, which are separated by an angle $\alpha$. The angle $\alpha$ may be between approximately 20-180 degrees, for example 90 degrees. The handle 16 of the beverage container 12 may extend downwardly such that the bottom end 16B may contact and/or otherwise descend within the clocking feature 26. In this regard, the rotational movement of the beverage container 12 within the cup holder tray 14 is limited by the clocking feature 26 as the rotational movement of the bottomed end 16B of the handle 16 is bounded in between the first and second radii R1, R2 of the clocking feature 26. Thereby, the beverage container 12 is in the unsecured position at a point when the handle 16 is proximate to the first radius R1 and the beverage container 12 is in the secured position at a point when the handle 16 is proximate to the second radius R2. The clocking feature 26 may be substantially level or the clocking feature 26 may have a slight incline. For example, the depressed arcuate section may be deeper closer to the second radius R2 and shallower closer to the first radius R1. Hence, the incline of the clocking feature 26 may exert a vertical lifting force on the bottom end 16B of the handle 16 as the beverage container 12 is rotated out of the secured position and towards the unsecured position.

Figure 6:
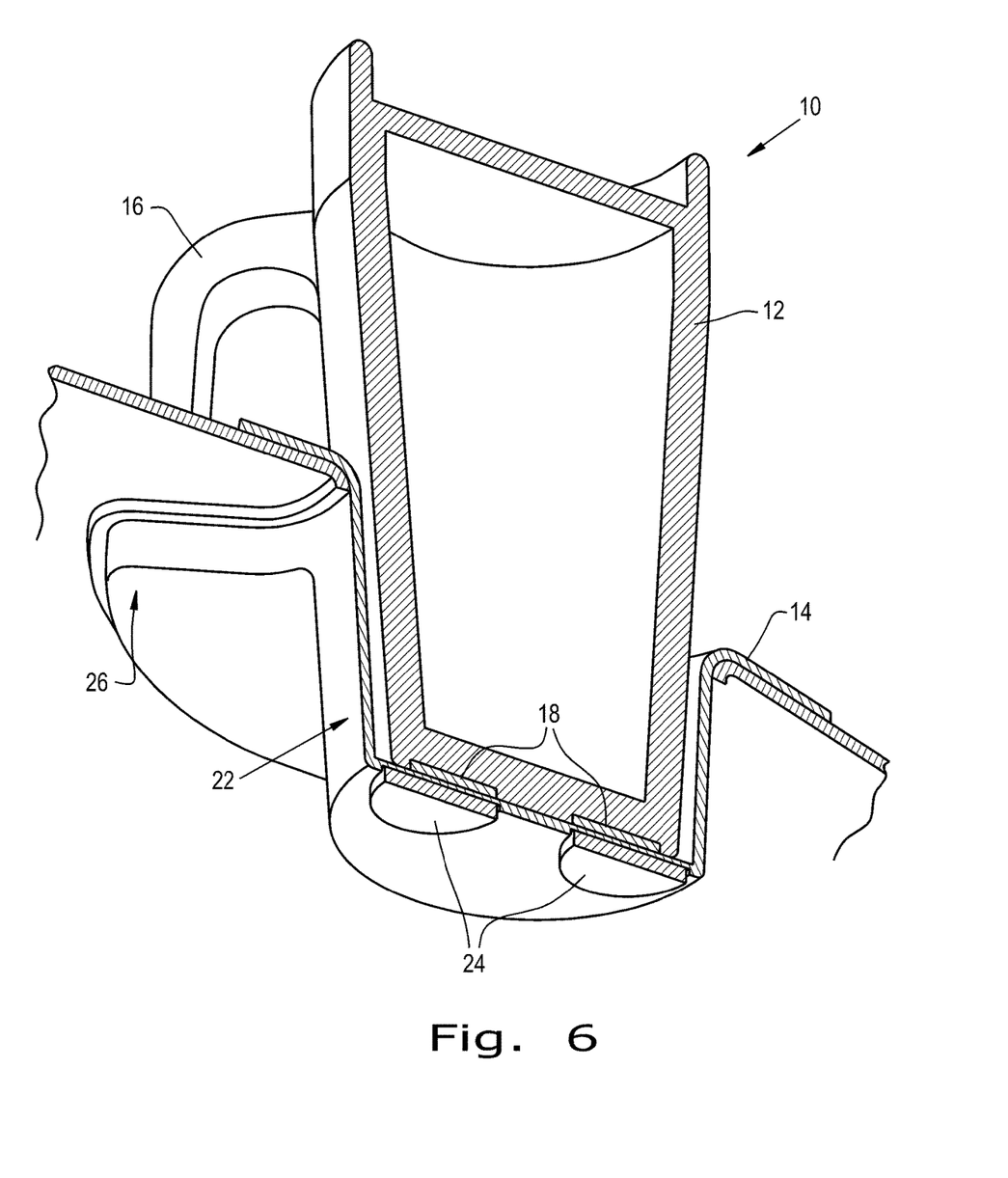
FIG. 6 illustrates a cross-sectional view of a secured position of the beverage retaining system of FIG. 1, taken across line 6-6 in FIG. 1, in accordance with an exemplary embodiment of the present invention.
Figure 7:
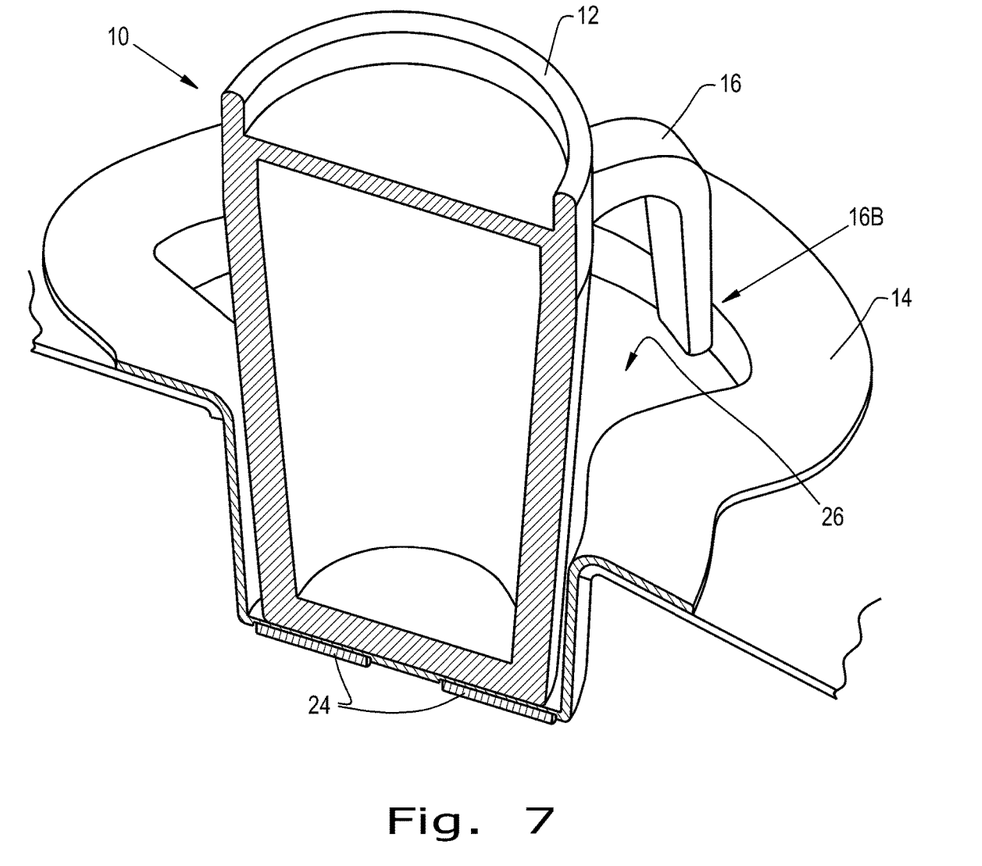
FIG. 7 illustrates a cutaway view of an unsecured position of the beverage retaining system of FIG. 1, in accordance with an exemplary embodiment of the present invention.

Referring now to FIGS. 6 and 7, there is shown the beverage retaining system 10 in the secured and unsecured positions. In the secured position, the retaining elements 18 are substantially engaged with the magnetic retention force of each magnetic element 24 such that the beverage container 12 is vertically held within the cup holder tray (FIG. 6). For example, the retaining elements 18 and the magnetic elements 24 may be substantially aligned with one another, respectively. When the respective retaining elements 18 and the magnetic elements 24 are aligned they may be partially or substantially overlapping and/or coaxially aligned. In the unsecured position, the retaining elements 18 are substantially disengaged with the magnetic retention force of each magnetic element 24 such that the beverage container 12 may be freely lifted from the cup holder tray 14 (FIG. 7). Thereby, in the unsecured position, the retaining elements 18 and the magnetic elements 24 may be substantially unaligned. The retaining elements 18 and the magnetic elements 24 may be offset from one another by approximately 90 degrees so that as the beverage container is rotated 90 degrees, the elements 18, 24 may either be substantially aligned or unaligned. The magnetic retaining force between the retaining elements 18 and the magnetic elements 24 is sufficient enough to retain a full beverage container 12. For example, the elements 18, 24 may be sized and paired in various strengths and configurations to obtain a retaining force that is approximately 20 lbs. or more. The retaining force may hold the beverage container even in extreme vertical accelerations, such as 5 or 6 G's. The magnetic retention force may further be strengthened by including a ferrous element that contacts both of the magnetic elements 24. For example, a steel plate may be included on the underside of the magnetic elements 24 so that the magnetic elements 24 are located in between the retaining elements 18 on the beverage container 12 and the plate (not shown).

Figure 8:
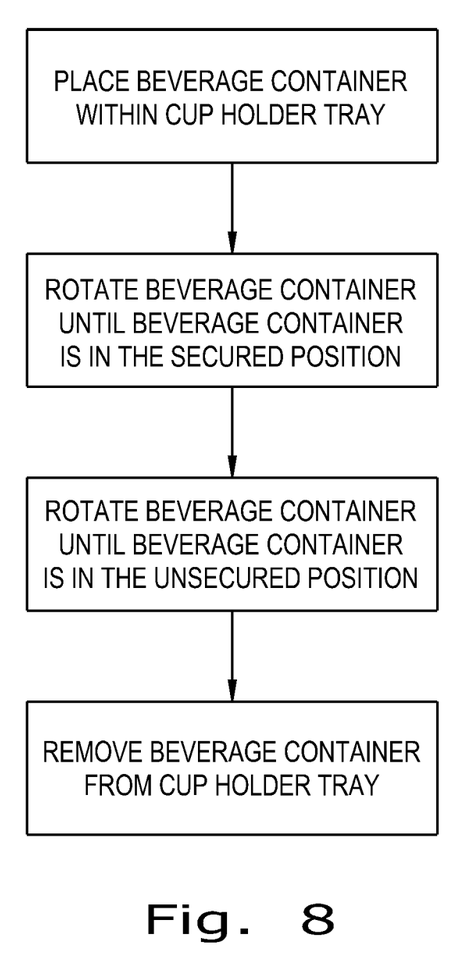
FIG. 8 illustrates a flowchart of a method in accordance with an exemplary embodiment of the present invention.

Referring now to FIG. 8, there is shown a flowchart illustrating the operation of the beverage retaining system 10. Initially, the beverage container 12 may be placed within the cup holder tray 14. The beverage container 12 may be rotated until the beverage container 12 is in the secured position. For example, the beverage container 12 may be rotated until the bottom end 16B of the handle 16 abuts against the second radius R1 of the clocking feature 26. To remove the beverage container 12, the beverage container 12 may be rotated until the beverage container 12 is in the unsecured position. For example, due to the low coefficient of friction between the beverage container 12 and the cup holder tray 14, the beverage container 12 may be easily rotated 90 degrees so that the magnetic elements 24 and the retaining elements 18 are no longer substantially aligned. In other words, the bottom end 16B of the handle 16 may be rotated until it abuts against the first radius R1 of the clocking feature 26. Once the beverage container 12 is in the unsecured position, the beverage container 12 may easily be removed from the cup holder tray 14.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A beverage retaining system for an off-road vehicle, comprising:
    a cup holder tray including a cup receiving portion with a bottom wall, a clocking feature adjacent to the cup receiving portion, and at least one magnetic element located subjacent to the bottom wall of the cup receiving portion and configured to provide a magnetic retention force; and
    a beverage container having a bottom end and at least one retaining element located on the bottom end, the beverage container being configured to be moveable between a secured position in which said at least one retaining element substantially engages with the magnetic retention force of said at least one magnetic element and an unsecured position in which said at least one retaining element substantially disengages with the magnetic retention force of said at least one magnetic element.

2. The beverage retaining system of claim 1, wherein said clocking feature is in the form of a depressed arcuate section extending between a first radius and a second radius.

3. The beverage retaining system of claim 2, wherein said beverage container further includes a protrusion in the form of a handle having a bottom end.

4. The beverage retaining system of claim 3, wherein a rotational movement of said beverage container within said cup holder tray is limited by the clocking feature as a rotational movement of said handle of said beverage container is bounded by the first radius and the second radius of the clocking feature such that said beverage container is in the unsecured position at a point of said handle being proximate to the first radius and said beverage container is in the secured position at a point of said handle being proximate to the second radius.

5. The beverage retaining system of claim 1, wherein in said secured position said at least one retaining element and said at least one magnetic element are substantially aligned with one another such that said beverage container is vertically held within the cup holder tray, and in said unsecured position said beverage container may be freely lifted from the cup holder tray.

6. The beverage retaining system of claim 1, wherein said at least one retaining element is at least one of a ferrous element and a magnetic element.

7. The beverage retaining system of claim 1, wherein said at least one retaining element is in the form of two retaining elements that are positioned opposite one another.

8. The beverage retaining system of claim 1, wherein said at least one magnetic element is in the form of a permanent magnet including at least one of a neodymium, a samarium-cobalt, an alnico, and a ceramic magnet.

9. The beverage retaining system of claim 1, wherein said at least one magnetic element is in the form of two magnetic elements that are disposed opposite one another and subjacent to the bottom wall of the cup receiving portion of the cup holder tray.

10. A cup holder tray, including:
    a cup receiving portion with a bottom wall, said cup receiving portion being configured to receive a beverage container;
    a clocking feature adjacent to the cup receiving portion and configured to limit a rotational movement of the beverage container between a first position and a second position; and
    at least one magnetic element located subjacent to the bottom wall of the cup receiving portion and configured to provide a magnetic retention force such that in the second position the beverage container is held within the cup receiving portion as at least one member of the beverage container substantially engages with said magnetic retention force, and in the first position the beverage container is freely removable as the at least one member of the beverage container is not substantially engaged with said magnetic retention force.

11. The cup holder tray according to claim 10, wherein said clocking feature is in the form of a depressed arcuate section extending between a first radius and a second radius.

12. The cup holder tray according to claim 10, wherein said at least one magnetic element is in the form of a permanent magnet including at least one of a neodymium, a samarium-cobalt, an alnico, and a ceramic magnet.

13. The cup holder tray according to claim 10, wherein said at least one magnetic element is in the form of two magnetic elements that are disposed opposite one another and subjacent to the bottom wall of the cup receiving portion of the cup holder tray.

14. A method for retaining a beverage in an off-road vehicle, comprising the steps of:
   providing a beverage retaining system that includes a cup holder tray including a cup receiving portion with a bottom wall, and at least one magnetic element located subjacent to the bottom wall of the cup receiving portion and configured to provide a magnetic retention force, and a beverage container having a bottom end and at least one retaining element located on the bottom end, said beverage container is configured to be moveable between a secured position in which said at least one retaining element substantially engages with the magnetic retention force of said at least one magnetic element and an unsecured position in which said at least one retaining element substantially disengages with the magnetic retention force of said at least one magnetic element;
   placing said beverage container within said cup holder tray;
   rotating said beverage container until said beverage container is in said secured position;
   rotating said beverage container until said beverage container is in said unsecured position; and
   removing said beverage container from said cup holder tray.

15. The method according to claim 14, wherein said cup holder tray further includes a clocking feature adjacent to the cup receiving portion.

16. The method according to claim 15, wherein said clocking feature is in the form of a depressed arcuate section extending between a first radius and a second radius.

17. The method according to claim 16, wherein said beverage container further includes a protrusion in the form of a handle having a bottom end.

18. The method according to claim 17, wherein a rotational movement of said beverage container within said cup holder tray is limited by the clocking feature as a rotational movement of said handle of said beverage container is bounded by the first radius and the second radius of the clocking feature such that said beverage container is in the unsecured position at a point of said handle being proximate to the first radius and said beverage container is in the secured position at a point of said handle being proximate to the second radius.

19. The method according to claim 14, wherein in said secured position said at least one retaining element and said at least one magnetic element are substantially aligned with one another such that said beverage container is vertically held within the cup holder tray, and in said unsecured position said beverage container may be freely lifted from the cup holder tray.

* * * * *